United States Patent [19]

Handa et al.

[11] 4,455,411

[45] Jun. 19, 1984

[54] PROCESS FOR PREPARING ACRYLAMIDE POLYMERS

[75] Inventors: Ryoji Handa, Yokosuka; Jun Hosoda, Yokohama; Kenzo Ariyama, Yokohama; Osamu Okushima, Yokohama; Nobuo Kurashige, Yokohama, all of Japan

[73] Assignees: Nitto Kagaku Kogyo Kabushiki Kaisha; Mitsubishi Rayon Co., Ltd.; Diafloc Co., Ltd., all of Tokyo, Japan

[21] Appl. No.: 504,215

[22] Filed: Jun. 14, 1983

[30] Foreign Application Priority Data

Jun. 14, 1982 [JP] Japan .................................. 57-100633

[51] Int. Cl.³ ....................... C08F 220/56; C08F 4/04; C08F 4/40
[52] U.S. Cl. .................................... 526/208; 526/214; 526/303.1
[58] Field of Search ............................... 526/208, 214

[56] References Cited

U.S. PATENT DOCUMENTS

| | | | |
|---|---|---|---|
| 2,560,694 | 7/1951 | Howard, Jr. | 526/208 |
| 3,560,468 | 2/1971 | Hambling et al. | 526/225 |
| 3,573,263 | 3/1971 | Gill | 260/79.3 |
| 3,781,254 | 12/1973 | Engelhardt | 526/303.1 |
| 3,931,122 | 1/1976 | Isaoka et al. | 526/208 |

FOREIGN PATENT DOCUMENTS

17-15616  8/1942  Japan .................................. 526/225

*Primary Examiner*—Joseph L. Schofer
*Assistant Examiner*—Peter F. Kulkosky
*Attorney, Agent, or Firm*—Robert E. Burns; Emmanuel J. Lobato; Bruce L. Adams

[57] ABSTRACT

Acrylamide polymers having remarkably high molecular weights can be obtained by polymerizing acrylamide or a monomer mixture comprising a preponderant quantity of acrylamide in an aqueous medium with the use of a specific redox initiator and a specific azo compound initiator. The polymerization initiator used in this porcess comprises a combination of a persulfate, formaldehyde sodium sufoxylate and 2,2′-azobis-2-amidinopropane.

7 Claims, No Drawings

PROCESS FOR PREPARING ACRYLAMIDE POLYMERS

BACKGROUND OF THE INVENTION

The present invention relates to the polymerization of acrylamide in an aqueous solution. More particularly, the invention relates to a process for preparing acrylamide polymers which is characterized by a specific polymerization initiator used therein.

Water-soluble polymers comprising acrylamide as their principal constituent are widely used as coagulants, viscosity imparting agents and the like, but there is a particular demand for those of a notably high molecular weight in recent years.

Such acrylamide polymers are ordinarily prepared by polymerizing in an aqueous solution acrylamide or a monomer mixture comprising acrylamide as its principal constituent. Polymerization initiators used in the preparation of acrylamide polymers are mostly azo compounds, peroxides, or redox initiators comprising peroxides and reducing agents. As other examples, combinations of azo initiators and redox initiators have also been proposed.

In general, an acrylamide polymer of a high molecular weight can be obtained by the polymerization in an aqueous solution under conditions of a low temperature and a reduced quantity of initiator. In this type of polymerization system wherein the product polymer is obtained as an aqueous mass having an exceedingly high viscosity or in gel form, it is necessary to initiate the polymerization at the lowest possible temperature in view of the fact that it is difficult to remove the heat generated during the polymerization by agitation. That is, since the temperature unavoidably rises once the polymerization is initiated, the polymerization should be initiated at a low temperature so as to avoid a reduction in the molecular weight of the product polymer due to an elevated polymerization temperature. In order to make possible the initiation of polymerization at a low temperature, redox initiators are employed.

On the other hand, water-soluble azo compounds are known as initiators for use in the polymerization of acrylamide in an aqueous solution as has been mentioned previously. The azo compound initiators generally provide high molecular weight polymers of few branched chains, and may therefore seem to be suitable polymerization initiators for use in the preparation of ultrahigh molecular weight acrylamide polymers. However, most of the commercially available azo compound initiators, when used at an ordinary concentration, cannot decompose at a low temperature to generate sufficient radicals for initiating polymerization. For this reason, the azo compound initiators cannot be used in the case where polymerization should be initiated at a low temperature as in the preparation of ultrahigh molecular weight acrylamide polymers.

This problem of the azo compound initiators can be solved by the use of redox initiators in combination therewith. More specifically, in the preparation of an ultrahigh molecular weight acrylamide polymers as described above, polymerization which has been initiated by a redox initiator at a low temperature proceeds to the decomposition temperature of an azo compound initiator used in combination, at which time the polymerization is resumed by the azo compound initiator whereby the advantages of this initiator set forth above can be utilized.

The method in which polymerization is conducted at a low temperature and an elevated temperature separately in the presence of polymerization initiators suitable for use in the respective temperature ranges may be said to be preferred from the point of view of the characteristics of the process for preparing ultrahigh molecular weight acrylamide polymers in which the polymerization temperature unavoidably rises as agitation cannot be employed.

This method, however, has been found to be still accompanied by various problems that will discourage the practice thereof on a commercial scale, such as a prolonged induction period or an excessively low polymerization rate, depending on the species of the redox initiators and the azo compound initiators employed in combination.

SUMMARY OF THE INVENTION

The present invention has succeeded in providing a process in which a specific redox initiator and a specific azo compound initiator are used to produce a maximum synergistic effect.

Thus, the distinguishing feature of the process for preparing acrylamide polymers according to this invention is the use of a polymerization initiator comprising a combination of a persulfate, formaldehyde sodium sulfoxylate and 2,2'-azobis-2-amidinopropane in the polymerization of acrylamide or a monomer mixture predominantly comprising acrylamide in an aqueous medium.

The combination of the polymerization initiator is critical as will be shown in the Comparison Examples set forth hereinlater, and, owing to this critical combination, the advantages demonstrated in the Examples set forth below can be obtained.

DETAILED DESCRIPTION OF THE INVENTION

1. Polymerization Initiator

The polymerization initiator used in the present invention comprises a combination of a persulfate, formaldehyde sodium sulfoxylate and 2,2'-azobis-2-amidinopropane. The term "comprises a combination" as used herein is intended to mean that, in addition to these three essential constituents, other constituents may also be incorporated in the initiator in minor amounts or as incidental components provided that the advantageous features of the present invention due to the combination of these three constituents are not thereby sacrificed.

Among the three constituents, the former two constitutents are considered to form a redox initiator although the present invention is in no way limited by such functional mechanism.

(1) Redox Initiator

The oxidizing agent component is a persulfate while the reducing agent component is formaldehyde sodium sulfoxylate.

The most typical persulfates are alkali metal salts, potassium salt and ammonium salt being particularly preferred.

A dihydrate of formaldehyde sodium sulfoxylate is known as Rongalit. Although the dihydrate is preferably used in the present invention, anhydrides or other forms of this compound may also be employed.

(2) Azo Compound

The azo compound used in the present invention is 2,2'-azobis-2-amidinopropane which is represented by the formula:

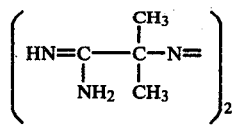

This azo compound, being basic, can be in the form of a hydrochloride or other salts, and is commonly marketed in such a form. Therefore, the term "2,2'-azobis-2-amidinopropane" as used herein refers to both the forms of a free base and a salt. While the hydrochloride is preferably employed in this invention, azo compounds in the form of another acid salt or free base, or in other forms may also be utilized.

2. Polymerization in an Aqueous Solution

The process for preparing acrylamide polymers according to the present invention does not differ essentially from the conventional method of polymerizing acrylamide in an aqueous solution except that the catalyst used comprises a combination of the three constituents described above.

The starting monomer is acrylamide or a monomer mixture predominantly comprising acrylamide, a monomer mixture containing more than 50 mol%, preferably 70 mol% or more, of acrylamide being especially suitable.

For the comonomers to be used in the monomer mixture together with acrylamide, any water-soluble ethylenically unsaturated monomer copolymerizable with the acrylamide can be utilized. For example, (a) (meth)acrylic acid, (b) salts thereof, such as ammonium salt, alkali metal salts, particularly sodium salt, and amine salts, and (c) amides thereof except for acrylamide can be used. (The term "(meth)acrylic acid" covers acrylic acid and methacrylic acid.) In addition to these neutral or anionic monomers, cationic comonomers, such as aminoalkyl esters and quaternary ammonium salts of (meth)acrylic acid, and Mannich base derivatives and quaternary ammonium salts of (meth)acrylamide, can be employed, if necessary.

The copolymer of acrylamide and comonomers enumerated above can be prepared by copolymerizing acrylamide and comonomers, or alternatively by partly hydrolyzing acrylamide or partly converting the same into a Mannich base during or after homopolymerization of the acrylamide to obtain a polymer in the form of a copolymer. A copolymer of acrylamide and a salt of acrylic acid which is one of the important acrylamide polymers can be prepared most advantageously by conducting homopolymerization of acrylamide at a high pH as will be described in detail hereinafter.

In view of the recently found uses of acrylamide polymers, it is preferable that these polymers have exceedingly high molecular weights. More specifically, it is preferable that a polyacrylamide have a molecular weight of at least 10,000,000. Such a high molecular weight acrylamide polymer is obtained by polymerization in an aqueous solution as an aqueous mass in gel form. The polymer concentration of the aqueous mass thus obtained, which is substantially equal to the monomer concentration in the aqueous medium as measured at the initiation of the polymerization in an aqueous solution since the polymerization yield or conversion is nearly 100%, is of the order of 15 to 40% by weight.

This aqueous mass in gel form practically cannot be agitated. As a result, the temperature of the polymerization system is inevitably allowed to rise due to the heat generated during the polymerization. In order to minimize the undesirable influence of the temperature rise, the polymerization is initiated at the lowest possible temperature. In the case where the redox initiator of the present invention is used, the preferred polymerization initiation temperature range is from 0 to about 30° C., particularly around 10° C. The polymerization system initiated at 10° C. reaches, for example, a maximum temperature of about 85 to 100° C. in the polymerization of acrylamide in an aqueous solution in a concentration of 25 to 30% by weight.

Although it may seem that the temperature rise in the polymerization system can be controlled by external cooling of the polymerization vessel, the aqueous mass in gel form within the vessel, if cooled externally, does not tend to have a uniform temperature throughout the mass because of the difference in temperature between the central portion and peripheral portion thereof. For this reason external cooling of the polymerization vessel is not recommended. Rather, in order to control the non-uniformity of the temperature in the central portion and peripheral portion of the aqueous mass in the form of gel to a minimum level, it is desirable that the polymerization vessel be heated externally in conformity with the temperature in the central portion of the mass.

The aqueous medium in which acrylamide and like monomers are to be dissolved may be either acidic, neutral or basic. A copolymer of acrylamide and a salt of acrylic acid which is one of the preferred acrylamide polymers is preferably prepared by increasing the basicity of the aqueous medium sufficiently in the process of formation of an acrylamide homopolymer so that the acrylamide component in the product polymer will be partly hydrolyzed. This is because not only is it unnecessary to prepare a salt of acrylic acid in advance, but also the difficulties encountered in the case where an acrylamide homopolymer is first produced and then is subjected to hydrolysis, such as difficulty in handling the aqueous mass in gel form and nonuniform hydrolysis, can be avoided. It is preferable that the pH of the aqueous medium, i.e., aqueous acrylamide solution, be 11 or higher, the upper limit being of the order of 13.

With respect to the quantity of the polymerization initiator of the present invention relative to that of the aqueous solution to be subjected to polymerization, 1 to 100 ppm of a persulfate, 0.1 to 50 ppm of formaldehyde sodium sulfoxylate, and 10 to 1000 ppm of 2,2'-azobis-2-amidinopropane may be used generally.

3. Experimental Examples

Example 1

1,000 g of a 50% aqueous acrylamide solution, 48 g of sodium borate (NaH$_2$BO$_3$) and 942 g of deionized water were weighed and charged into a 3-l Dewar flask. The pH of this aqueous solution was 12.2. The temperature of the aqueous solution was adjusted to 10° C., and the atmosphere within the flask was purged with nitrogen for about 30 minutes. To the resulting aqueous solution were added 5 ppm of ammonium persulfate, 10 ppm of formaldehyde sodium sulfoxylate, and 300 ppm of 2,2'-azobis-2-amidinopropane hydrochloride respectively in 2 ml, 3 ml, and 5 ml aqueous solutions.

After approximately 5 minutes, polymerization was initiated, and 100 minutes after the initiation, the temperature reached a peak of 85° C. The rubbery gel thus obtained was left standing at 85° C. for 16 hours, and mers obtained are summarized in Table 1. In Table 1 and all succeeding Tables, Polymerization Time means a time period from the initiation of polymerization until the temperature reached a peak.

TABLE 1

| | | | Example | | Comparison Example | | | | | |
|---|---|---|---|---|---|---|---|---|---|---|
| | | | 2*1 | 3*1 | 3 | 4 | 5 | 6 | 7 | 8 |
| Species and quantity of redox initiator added (ppm) | Oxidizing agent | ammonium persulfate | | 5 | | | | | | |
| | | potassium persulfate | 10 | | 10 | | 10 | 10 | 10 | |
| | | hydrogen peroxide | | | | 20 | | | | |
| | | tertiary butyl hydroperoxide | | | | | | | | 30 |
| | Reducing agent | formaldehyde sodium sulfoxylate | 15 | 3 | | 10 | | | | |
| | | acid sodium sulfite | | | 15 | | | | | |
| | | sodium thiosulfate pentahydrate | | | | | | | | 40 |
| | | dimethylaminopropionitrile | | | | | 30 | | | |
| | | triethanolamine | | | | | | 20 | | |
| | | dimethylaminoethanol | | | | | | | 30 | |
| Induction period (min.) | | | 5 | 5 | 5 | 1080 | 10 | 5 | 5 | |
| Polymerization time (min.) | | | 95 | 110 | 330 | 810 | 270 | 320 | 400 | not polymerized |
| Degree of hydrolysis (mol%) | | | 13.3 | 14.3 | 13.2 | 15.1 | 14.7 | 13.4 | 14.2 | |
| 1% Aqueous solution viscosity pH 2.2 (cps) | | | 1880 | 2200 | 1600 | 1200 | 1350 | (1400) | (1500) | |
| Insolubles | | | none | none | none | none | none | little | copious | |

*1 2,2'-azobis-2-amidinopropane hydrochloride 200 ppm then cut into small particles through a mincer, dried in a hot air drier at 60° C., and pulverized into powder form.

5 g of the powdery polymer thus obtained was dissolved in 495 g of deionized water. The viscosity of the resulting solution was 12,600 cps as measured by means of a Brookfield viscometer (using Rotor No. 2 up to 5,000 cps and Rotor No. 3 above 5,000 cps both at a speed of 6 rpm and a temperature of 25° C. as in all succeeding Examples). Further, the viscosity as measured under acidic conditions (pH 2.2) with 1% aqueous solution of this polymer to which 10 ml of 2N.H$_2$SO$_4$ had been added was 1,900 cps. The degree of hydrolysis as measured with a part of this aqueous solution was 14.5 mol%. It was noted that this aqueous solution contained no insolubles.

Comparison Example 1

The procedure of Example 1 was followed except that 2,2'-azobis-2-amidinopropane hydrochloride was not added. The induction period of polymerization was 10 minutes, and the temperature reached a peak about 15 hours after the initiation of polymerization.

The viscosity of the polymer obtained was 1,670 cps as measured under acidic conditions (pH 2.2), and the degree of hydrolysis was 14.0 mol%. The residual acrylamide in the polymer was found by gas chromatography to be 0.02%.

Comparison Example 2

Polymerization was conducted as in Example 1 except that ammonium persulfate and formaldehyde sodium sulfoxylate were not added, but it was found that the polymerization reaction had not progressed even after 24 hours.

Examples 2 and 3 and Comparison Examples 3 to 8

The procedure of Example 1 was followed except that the ammonium persulfate and formaldehyde sodium sulfoxylate were replaced by redox initiators of the species and in the quantities shown in Table 1. The polymerization behavior and the properties of the polymers obtained are summarized in Table 1. In Table 1 and all succeeding Tables, Polymerization Time means a time period from the initiation of polymerization until the temperature reached a peak.

Comparison Examples 9 to 12

The procedure of Example 1 was repeated except that the 2,2'-azobis-2-amidinopropane hydrochloride was replaced by azo compounds of the species and in the quantities shown in Table 2. The results obtained are set forth in Table 2.

TABLE 2

| | Comparison Example | | | |
|---|---|---|---|---|
| | 9 | 10* | 11 | 12* |
| Species and quantity of azo compounds | | | | |
| 2,2'-azobisisobutyronitrile | 500 | | | |
| 2,2'-azobis-4-methoxy-2,4-dimethylvaleronitrile | | 300 | | |
| 4,4'-azobis-4-cyanovaleric acid | | | 250 | |
| 2,2'-azobis-2,4-dimethyl valeronitrile | | | | 300 |
| Induction period (min.) | 270 | 10 | 600 | 10 |
| Polymerization time (min.) | 1200 | 90 | 300 | 40 |
| Degree of hydrolysis (mol %) | | 14.0 | | 14.7 |
| 1% Aqueous solution viscosity pH 2.2 (cps) | | (1200) | | (800) |
| Insolubles | copious | | copious | none |

*Polymerization was not completed.

Examples 4 to 6 and Comparison Examples 13 to 15

These Examples and Comparison Examples show the effect of the pH of the polymerization system on the polymerization behavior. Polymerization was conducted with a 20% aqueous acrylamide solution in accordance with the procedure of Example 1 except where otherwise specified. The results obtained are shown in Table 3.

In the Table, the starting acrylamides A, B and C are commercially available liquid acrylamide (50% aqueous solution), crystalline acrylamide, and acrylamide obtained by recrystallizing twice the acrylamide B from water and methanol. The pH of the reaction solution was adjusted to 7 with caustic soda, and to 10 with boric acid (H$_3$BO$_3$) and caustic soda.

As is apparent from Table 3, the polymerization behavior varied widely with the species of the starting acrylamide at a high pH in the case where 2,2'-azobis-2-amidinopropane hydrochloride was used singly (Comparison Examples 13, 14 and 15) presumably because of impurities contained in the monomer in trace amounts while the polymerization behavior was remarkably stable in Examples of the present invention.

TABLE 3

| Example | 4 | | | 5 | | | 6 | | |
|---|---|---|---|---|---|---|---|---|---|
| pH | 7 | | | 10 | | | 12.2 | | |
| Type of starting acrylamide | A | B | C | A | B | C | A | B | C |
| Induction period (min.) | 5> | — | 5> | 5> | — | 5> | 5> | 5> | 5> |
| Polymerization time (min.) | 70 | — | 70 | 75 | — | 70 | 110 | 115 | 110 |
| Comparison Example*[1] | 13 | | | 14 | | | 15 | | |
| pH | 7 | | | 10 | | | 12.2 | | |
| Type of starting acrylamide | A | B | C | A | B | C | A | B | C |
| Induction period (min.) | 5 | 5 | 15 | 5 | 20 | 20 | 120 | 280 | |
| Polymerization time (min.) | 40 | 40 | 50 | 50 | 50 | 70 | 270 | 400 | not polymerized |

*[1]Polymerization initiation temperature: 30° C.
Polymerization initiator: 2,2'-azobis-2-amidinopropane hydrochloride, used singly, 300 ppm/solution

Example 7

The procedure of Example 1 was followed except that the sodium borate ($NaH_2BO_3$) was replaced by 36 g of sodium carbonate ($Na_2CO_3$), the pH of the reaction solution being 12.3. As a result, the induction period was about 5 minutes, the polymerization time 110 minutes, the degree of hydrolysis of the product polymer 13.4 mol%, and the viscosity of a 1% aqueous solution of this polymer (pH 2.2) 2,000 cps.

Example 8

150 g of acrylamide and 187.5 g of a 80% aqueous solution of dimethylaminoethyl methacrylate quaternized with methyl chloride were dissolved in deionized water. The resulting solution was adjusted to a pH of 3.5 with $1/10N.H_2SO_4$ and a total weight of 992 g. This solution was charged into a 1.5-l Dewar flask and the temperature was adjusted to 20° C. The atmosphere within the flask was purged with nitrogen for 30 minutes. To this aqueous solution were then added 4 ml of an aqueous solution containing 0.4 g of 2,2'-azobis-2-amidinopropane hydrochloride and 2 ml each of an aqeuous solution containing 0.01 g of ammonium persulfate and an aqueous solution containing 0.01 g of formaldehyde sodium sulfoxylate, and the atmosphere within the flask was further purged with nitrogen for 5 minutes.

Ten minutes after the addition of the initiator, polymerization started, and 50 minutes thereafter, the temperature reached a peak of 90° C., whereupon the polymerization completed. The thus obtained polymer in gel form was comminuted through a mincer and dried at 60° C. A 1% aqueous solution of this polymer had a viscosity of 7,200 cps.

Finally, some examples showing the relationship between the polymerization time and the polymerization yield are set forth in Table 4 in order to demonstrate the specificity of the polymerization behavior developed by the initiator of the present invention.

The synergistic effect of the combination of the redox initiator and the azo compound, i.e., polymerization promoting effect, was clearly observed in the present invention (Example 1) from immediately after the initiation of polymerization while no such synergistic effect was noted in the case of conventional initiator combinations (Comparison Examples 5 and 11, for instance).

TABLE 4

| | | Example 1 | Comparison Example 1 | Comparison Example 2 | Comparison Example 5 | Comparison Example 11 |
|---|---|---|---|---|---|---|
| Polymerization initiator (ppm) | Redox | ammonium persulfate (5) formaldehyde sodium sulfoxylate (10) | ammonium persulfate (5) formaldehyde sodium sulfoxylate (10) | | potassium persulfate (10) dimethylaminopropionitrile (30) | ammonium persulfate (5) formaldehyde sodium sulfoxylate (10) |
| | Azo compound | 2,2'-azobis-2-amidinopropane hydrochloride (300) | | 2,2'-azobis-2-amidinopropane hydrochloride (300) | 2,2'-azobis-2-amidinopropane hydrochloride (300) | 4,4'-azobis-4-cyanovaleric acid (250) |
| Induction period (min.) | | 5 | 10 | | 10 | 600 |
| Polymerization time (min.) and yield (%) | 0 min. | 0% | 0% | | 0% | 0% |
| | 5 | 2.3 | — | | — | — |
| | 25 | 17.7 | — | | — | — |
| | 40 | 35 | — | | — | — |
| | 60 | 62 | 3 | | 3 | 3 |
| | 70 | 81 | — | | — | — |
| | 90 | 99 | — | not polymerized | — | — |
| | 120 | 100 | 12 | | 12 | 6 |
| | 180 | | 25 | | 25 | 11 |
| | 210 | | — | | 46 | 28 |
| | 240 | | — | | 92 | 79 |
| | 270 | | — | | 100 | 98 |
| | 300 | | 71 | | | 100 |
| | 360 | | 88 | | | |

TABLE 4-continued

| | Example 1 | Comparison Example | | |
|---|---|---|---|---|
| | | 1 | 2 | 5 | 11 |
| | 900 | 99 | | | |

What is claimed is:

1. A process for preparing acrylamide polymers which comprises polymerizing acrylamide or a monomer mixture predominantly comprising acrylamide in an aqueous medium with the use of a polymerization initiator comprising a combination of a persulfate, formaldehyde sodium sulfoxylate and 2,2'-azobis-2-amidinopropane.

2. A process for preparing acrylamide polymers as claimed in claim 1, wherein the aqueous medium is basic.

3. A process for preparing acrylamide polymers as claimed in claim 2, wherein the basicity of the aqueous medium is sufficient to partly hydrolyze the acrylamide component in the product polymer.

4. A process for preparing acrylamide polymers as claimed in claim 2, wherein the aqueous medium has a pH of 11 or higher.

5. A process for preparing acrylamide polymers as claimed in claim 3, wherein the aqueous medium has a pH of 11 or higher.

6. The process for preparing acrylamide polymers as claimed in claim 1 wherein said persulfate is an alkali metal or ammonium salt.

7. The process for preparing acrylamide polymers as claimed in claim 1 wherein said persulfate is a potassium or ammonium salt.

* * * * *